United States Patent [19]

Hartig et al.

[11] Patent Number: 4,586,595
[45] Date of Patent: May 6, 1986

[54] CLUTCH DISC UNDER-TOAD AND IDLING DAMPING MEANS

[75] Inventors: Franz Hartig, Dittelbrunn; Dagwin Tomm, Kaiserslautern, both of Fed. Rep. of Germany

[73] Assignee: Fichtel & Sachs AG, Fed. Rep. of Germany

[21] Appl. No.: 680,391

[22] Filed: Dec. 11, 1984

[30] Foreign Application Priority Data

Dec. 15, 1983 [DE] Fed. Rep. of Germany ....... 3345409

[51] Int. Cl.[4] .............................................. F16D 3/14
[52] U.S. Cl. ................................................ 192/106.2
[58] Field of Search .............. 192/106.2, 106.1, 70.17, 192/70.18

[56] References Cited

U.S. PATENT DOCUMENTS

| 4,024,938 | 5/1977 | Maucher | 192/106.2 |
| 4,301,907 | 11/1981 | Carpenter et al. | 192/106.2 |
| 4,433,771 | 2/1984 | Caray | 192/106.2 |
| 4,496,036 | 1/1985 | Loizeau | 192/106.2 |
| 4,533,031 | 8/1985 | Nagano | 192/106.2 |
| 4,537,295 | 8/1985 | Fadler et al. | 192/106.2 |

FOREIGN PATENT DOCUMENTS

| 7205198 | 9/1972 | Fed. Rep. of Germany . |
| 1680049 | 4/1973 | Fed. Rep. of Germany . |
| 2814240 | 10/1978 | Fed. Rep. of Germany . |
| 2131914 | 6/1984 | United Kingdom . |

Primary Examiner—George H. Krizmanich
Attorney, Agent, or Firm—Toren, McGeady, Stanger, Goldberg & Kiel

[57] ABSTRACT

The clutch disc for a motor vehicle friction disc clutch comprises a hub provided with an external toothing, and two hub discs of which a first hub disc carries on its internal circumference an internal toothing meshing with play in rotation in the external toothing and the other hub disc is connected non-rotatably and without play in rotation with the hub. Axially on both sides of the first hub disc, side discs are connected with clutch friction linings to form a unit mounted rotatably on the hub. Radially within a zone defined by damping springs of the under-load vibration damper, there are provided, axially between the side discs, damping spring of an idling vibration damper which couple the hub disc through the damping springs with the second hub disc.

15 Claims, 9 Drawing Figures

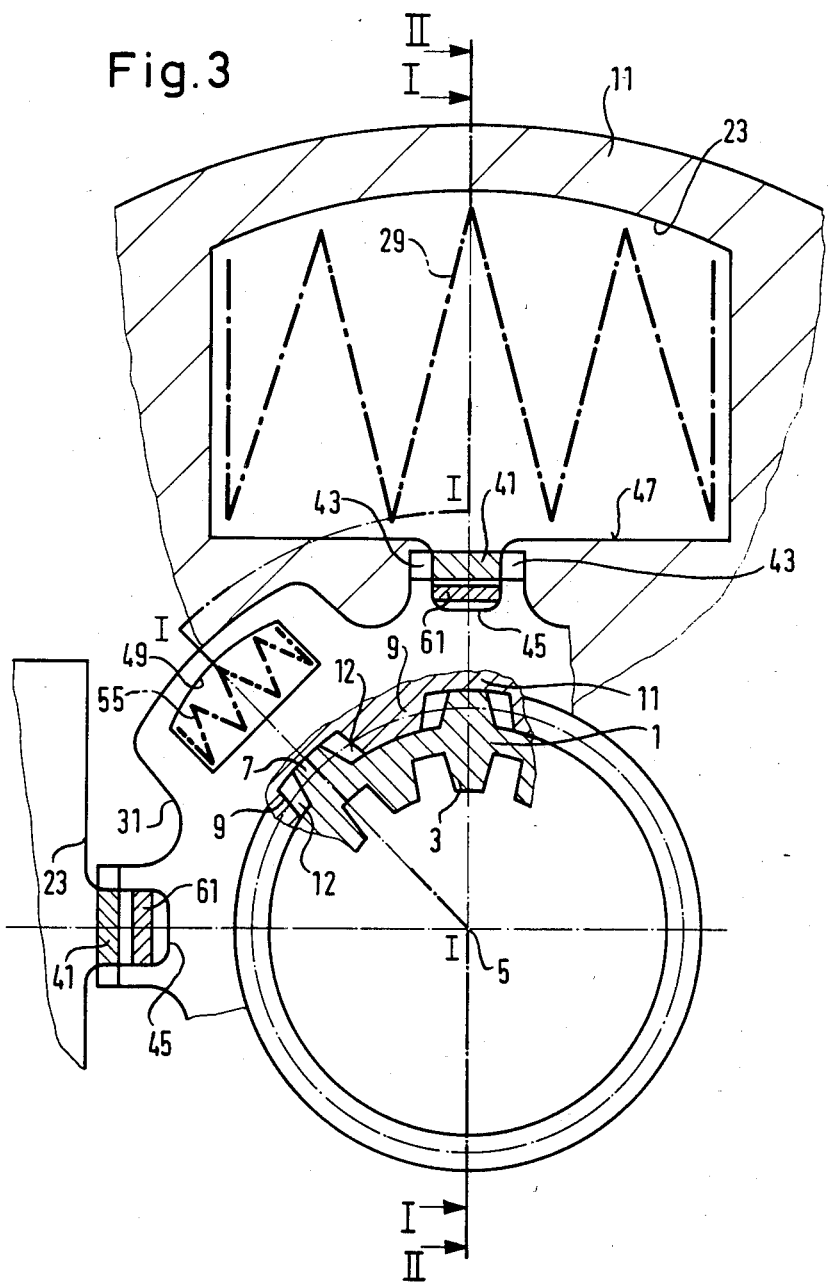

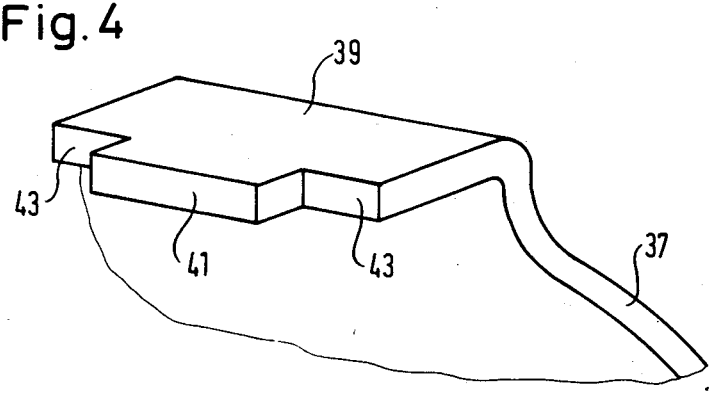
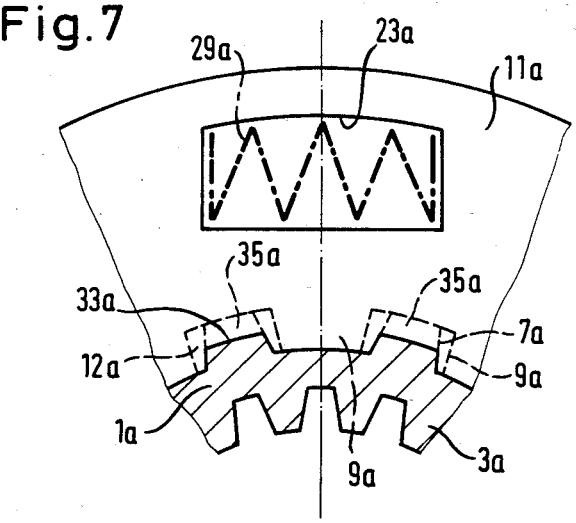

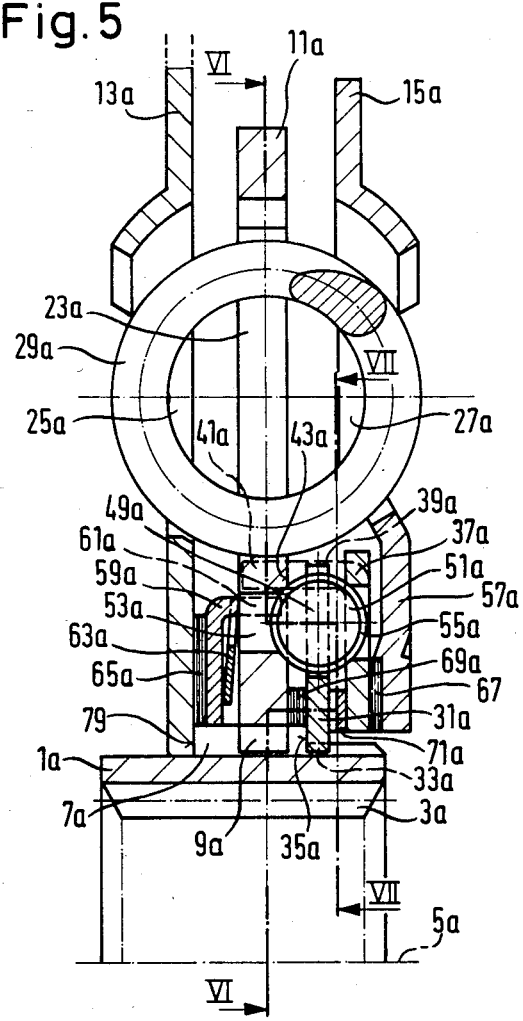

CLUTCH DISC UNDER-TOAD AND IDLING DAMPING MEANS

BACKGROUND OF THE INVENTION

The invention relates to a clutch disc for a motor vehicle friction disc clutch, and especially a clutch disc having a torsional vibration damper for operation under load and a torsional vibration damper separate therefrom for idling operation.

STATEMENT OF PRIOR ART

From German Utility Model No. 7,205,198 a clutch disc for a motor vehicle friction disc clutch is known in which a radially protruding hub disc is coupled non-rotatably, except for a pre-determined play in rotation, through a toothing to a hub which is to be coupled with the gearing input shaft. Axially on both sides of the hub disc, side discs are rotatably mounted on the hub and carry the friction linings of the clutch disc. Damping springs which can be stressed in the relative rotation of the hub disc and the side discs are arranged in windows of these discs. The damping springs together with the hub disc and the two side discs form a torsional vibration damper for the under-load range of the clutch. Axially laterally of this under-load vibration damper there is arranged a vibration damper for the idling range. The idling vibration damper likewise includes a hub disc seated non-rotatably on the hub and, axially on both sides of the hub disc, two side discs connected with one another and with the side disc unit of the under-load vibration damper.

In this clutch disc the input parts of the two vibration dampers, formed by the side discs, are firmly connected with one another. The idling vibration damper of the known clutch disc is also stressed over the entire relative angle of rotation of the under-load vibration damper. Since only relatively little space is available for the installation of the damping springs of the idling vibration damper, the maximum angle of rotation of the known clutch disc is limited. Furthermore, the attuning of the spring characteristics of the idling vibration damper is problematical.

From German Pat. No. 1,680,049 a clutch disc is known in which the friction linings are held on a hub disc which is rotatable in relation to the hub. The hub disc is arranged axially between two side discs which in turn are secured to a hub sleeve. The hub sleeve encloses the actual hub of the clutch disc and is coupled non-rotatably but with play in the circumferential direction with the hub through a toothing. The hub disc and the two side discs together with damping springs again form a torsional vibration damper for the under-load range. Axially laterally of the under-load vibration damper there is arranged a torsional vibration damper for the idling range, which likewise consists of a hub disc coupled non-rotatably with the hub, two side discs axially on both sides of this hub disc and damping springs. The side discs of the idling vibration damper are firmly connected with the side discs of the under-load vibration damper.

In this clutch disc the input parts of the idling vibration damper are coupled with the output parts of the under-load vibration damper. While thus the attuning of the idling vibration damper is facilitated, the axial extent of the clutch disc is however relatively great.

From Fed. German Publ. Spec. No. 28 14 240 a clutch disc is known, on the hub of which a hub disc is seated. The hub disc is connected with the hub through a toothing with rotational play, buth otherwise non-rotatably. Axially on both sides of the hub disc there are arranged side discs which are connected with one another to form a unit which is rotatable in relation to the hub disc and carries the friction linings of the clutch disc. The hub disc and the side discs together with damping springs form a vibration damper for the under-load range. A damping spring attuned for the idling range is seated radially between the hub and the hub disc in an aperture of the toothing. While this clutch disc requires little space in the axial direction, the idling vibration damper can be attuned only limitedly however, since the space available for the damping spring is limited.

OBJECT OF THE INVENTION

An object of the invention is to provide a clutch disc with separate vibration dampers for the under-load range and the idling range which has relatively small dimensions in the axial direction but in which there is comparatively plenty of room for the idling vibration damper. The idling vibration damper should be accommodated in protected manner and the clutch disc is to be simple to produce.

SUMMARY OF THE INVENTION

The clutch disc according to the invention comprises a hub provided with an external toothing and two hub discs coaxially enclosing the hub, of which a first hub disc carries on its internal circumference an internal toothing which engages in the external toothing and couples the first hub disc with pre-determined rotational play non-rotatably with the hub, and the second hub disc is held substantially without rotational play non-rotatably on the hub. The first hub disc, together with two first side discs arranged on axially opposite sides and several damping springs arranged in windows of the first hub disc and of the first side discs, forms an under-load vibration damper. The second hub disc is arranged axially between the first hub disc and one of the two first side discs and, together with at least one second side disc connected non-rotatably with the first hub disc, and at least one damping spring, forms an idling vibration damper which is accommodated in protected manner between the first side discs in the construction space in any case occupied by the damping springs of the under-load vibration damper. The idling vibration damper is bridged over in the operation of the under-load vibration damper. Relatively much space is available for the accommodation of the damping springs of the idling vibration damper, so that the spring characteristics and if desired the characteristics of an idling friction damper can be varied within wide limits.

In a preferred embodiment the second side disc of the idling vibration damper is supported through axially bent-off tabs on the hub disc of the under-load vibration damper. In this way an idling vibration damper accommodated axially between the hub disc of the under-load vibration damper and the side disc of the idling vibration damper can be decoupled from the spring forces of an under-load friction damper accommodated axially outside this region. The hub disc of the under-load friction damper can be provided with windows for the accommodation of the damping springs of the idling friction damper, so that the idling vibration damper makes one single side disc suffice, which reduces the axial space requirement of the clutch disc.

In a preferred embodiment the region of the external toothing of the hub which carries the hub disc of the under-load vibration damper is limited by two axially outwardly facing shoulders. One of the side discs of the under-load vibration damper rests against the one shoulder, while the hub disc of the idling vibration damper rests on the other shoulder. In this way the torsional vibration damper of the clutch disc can be fixed axially on the hub without additional securing rings or without additional swaged-on shoulders.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 3 shows an axial cross-section through the clutch disc seen along a line III—III in FIG. 2;

FIG. 4 shows a perspective detail view of a side disc of an idling vibration damper of the clutch disc;

FIG. 5 shows an axial longitudinal section through one half of a second embodiment of a clutch disc for a motor vehicle friction disc clutch, seen along a line V—V in FIG. 6;

FIG. 7 shows a detail section through the clutch disc, seen along a line VII—VII in FIG. 5;

DESCRIPTION OF THE PREFERRED EMBODIMENTS

Figure 1:
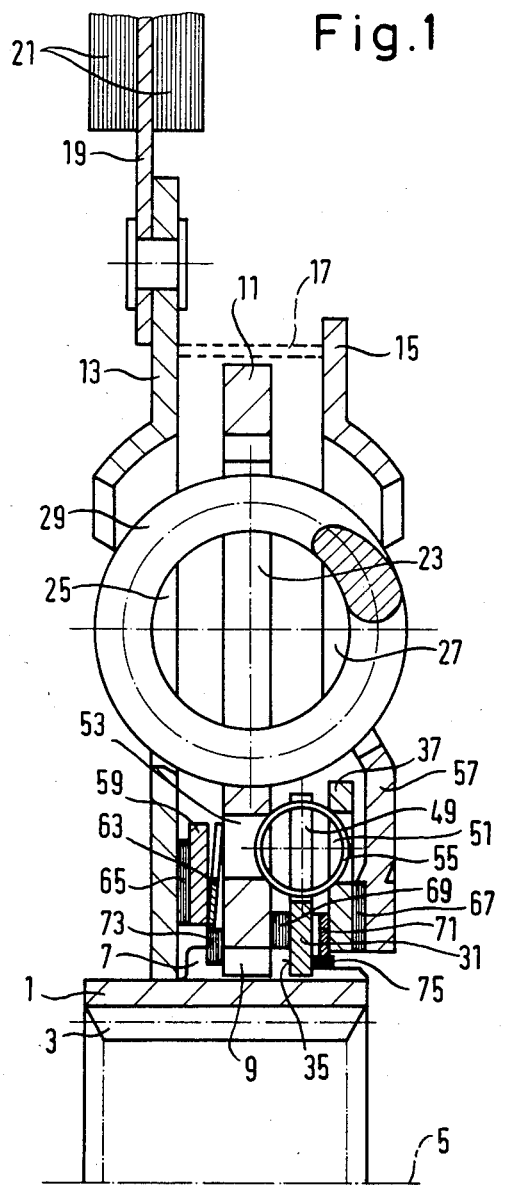
FIG. 1 shows an axial longitudinal section through one half of a first embodiment of a clutch disc for a motor vehicle friction disc clutch, seen along a line I—I in FIG. 3.
Figure 2:
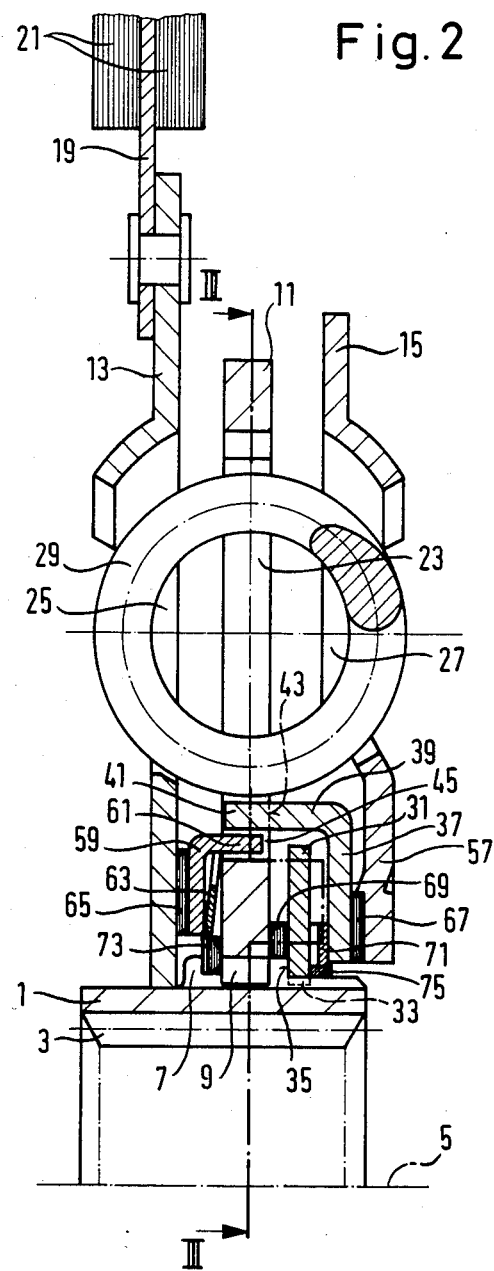
FIG. 2 shows an axial longitudinal section through the clutch disc seen along a line II—II in FIG. 3.

FIGS. 1 to 3 show a clutch disc with a hub 1 which is couplable non-rotatably but axially displaceably through an internal toothing 3 with an input shaft (not further illustrated) rotatable about an axis 5 of rotation, of a motor vehicle gear. The hub 1 carries on its external circumference an external toothing 7 in which there engages an internal toothing 9 of a first hub disc 11, which protrudes substantially radially, and couples the hub disc 11 non-rotatably but with a predetermined play 12 in rotation (FIG. 3) in the circumferential direction.

Axially on both sides of the hub disc 11 at an axial distance therefrom there are arranged two side discs 13, 15 which, as indicated at 17, are connected by distance rivets (not shown further) into a unit which is mounted rotatably through the side disc 13 on the hub 1. On the side disc 13 there is riveted an annular lining-carrier disc 19 which is provided, radially outside the side discs 13, 15, with clutch friction linings 21 axially on both sides.

In windows 23 of the hub disc 11 for the one part and windows 25, 27 of the two side discs 13, 15 axially corresponding to the windows 23 for the other part there are seated damping springs 29, formed as helical springs, which on rotation of the side discs 13, 15 in relation to the hub disc 11 are stressed and damp the rotational vibration. The damping springs 29 are dimensioned for the operation of the clutch disc under load. Although the Figures show only one of the damping springs 29, the clutch disc comprises several springs of this kind offset in relation to one another in the circumferential direction on a common diameter circle.

Radially within the damping springs 29, in relation to the clutch disc, a second, substantially radially protruding, annular hub disc 31 is arranged which is coupled non-rotatably and without rotary play through an internal toothing 33 of its internal circumference with the external toothing 7 of the hub 1. The external toothing 7 is reduced in its external diameter in the region of its axial end adjacent to the hub disc 31, forming a shoulder 35 facing away from the hub disc 11. The hub disc 31 lies against the shoulder 35. Axially between the hub disc 31 and the side disc 15 there is likewise arranged radially within the region defined by the damping springs 29 an annular side disc 37 which, as shown by FIG. 2, carries axially directed tabs 39 on its external circumference. As may best be seen from FIG. 4, the tabs 39 have at their free ends noses 41 which are defined on both sides in the circumferential direction by shoulders 43. The noses 41 engage in openings 45 of the hub disc 11, while the shoulders 43 are supported on the flat side of the hub disc 11. The openings 45 are formed as extensions of the windows 23 extending radially inwards from the inner edges 47 of the windows 23. The tabs 39 hold the side disc 37 non-rotatably on the hub disc 11 at a pre-determined distance therefrom.

In the hub disc 31 there are provided several windows (49) offset in the circumferential direction in relation to one another, axially opposite to which there lie complementary windows 51 in the side disc 37 and windows 53 in the hub disc 11. Damping springs 55 formed as helical compression springs are seated in the windows 49, 51, 53. The helical compression springs 55 together with the hub disc 31, the side disc 37 and the axially adjacent zones of the hub disc 11 form an idling vibration damper which is accommodated in protected manner in a convexity 57 of the side disc 15. The convexity 57 extends radially within the region limited by the damping springs 29 and in the axial direction is approximately flush with the damping springs 29. In this way the space available between the damping springs 29 of the under-load vibration damper and the external toothing 7 of the hub 1, in both radial and axial directions, is optimally exploited. The helical compression springs 55 in this case are seated in the circumferentail direction between neighboring tabs 39.

The clutch disc further includes an under-load friction damper and an idling friction damper. The under-load friction damper includes a pressure plate 59 of annular disc form which carries axially bent-off tabs 61 on its external circumference. The tabs 61 engage in the openings 45 of the tabs 39 and guide the pressure plate 59 non-rotatably but axially displaceably on the hub disc 11. The pressure plate 59 in this case is arranged on the side of the hub disc 11 axially remote from the damping springs 55 and thus from the idling vibration damper. An axially acting spring 63, for example a dished spring, is arranged axially between the pressure plate 59 and the hub disc 11. A friction ring 65 is seated axially between the pressure plate 59 and the side disc 13. A further friction ring 67 is provided between the side disc 15 and the side disc 37. The spring 63, supported with its one circumference on the hub disc 11, is supported with its other circumference by way of the pressure plate 59, the friction ring 65, the side disc 13, the side disc 15 firmly connected with the side disc 13, the friction ring 67 and the tabs 39 of the side disc 37, in a closed force path on the axially opposite side of the hub disc 11.

The idling friction damper is independent of the initial stress force of the spring 63 and is seated in protected manner between the hub disc 11 and the side disc 37. It includes a friction ring 69 arranged axially between the hub disc 11 and the hub disc 31 and an axially acting corrugated spring 71 arranged axially between the hub disc 31 and the side disc 37. The corrugated spring 71, which is supported with its one axial side on the hub disc 31, bears through the side disc 37, the tabs 39, the hub disc 11 and the friction ring 69 on the axially opposite side of the hub disc 31 in a closed force path centred in relation to the hub disc 31. The initial stress force of the spring 63 is greater than that of the corrugated spring 71, so that the shoulders 43 of the tabs 39 always remain in abutment on the hub disc 11.

The axial fixing of the vibration dampers of the clutch disc is provided on the side of the hub disc 11 axially remote from the hub disc 31 by a securing ring 73, on the external toothing 7. On the side of the hub disc 31 axially remote from the hub disc 11 there is provided a further securing element 75, for example in the form of a securing ring, or an upset portion or the like. In the operation of the clutch disc the unit consisting of the friction linings 21 and the side discs 13, 15 is rotated in relation to the hub 1 about the axis 5 of rotation. In idling operation with small torques to be transmitted and small angles of rotation, the rotational vibrations are damped exclusively by the idling spring damper and the idling friction damper. The working range of the idling vibration damper is determined by the play 12 between the external toothing 7 of the hub 1 and the internal toothing 9 of the hub disc 11. In idling operation the torques to be transmitted are smaller than the friction torque exerted by the under-load friction damper through the friction rings 65, 67 upon the hub disc 11. In idling operation thus the side discs 13, 15, the side disc 37 and the hub disc 11 form a non-rotatable unit and rotational vibrations between this unit and the hub disc 31, coupled non-rotatably with the hub 1, are damped through the damping springs 55 and the friction ring 69.

When greater torques are to be transmitted in operation under load, the relative angle of rotation between the hub disc 11 and the hub 1 increases. After compensation of the play 12 between the toothings 7, 9, the idling damper is bridged over and the rotational vibrations are damped by the under-load spring damper and the under-load friction damper. By suitable dimensioning of the windows and the toothing the play 12 can be unequally distributed in mutually opposite directions.

Figure 6:
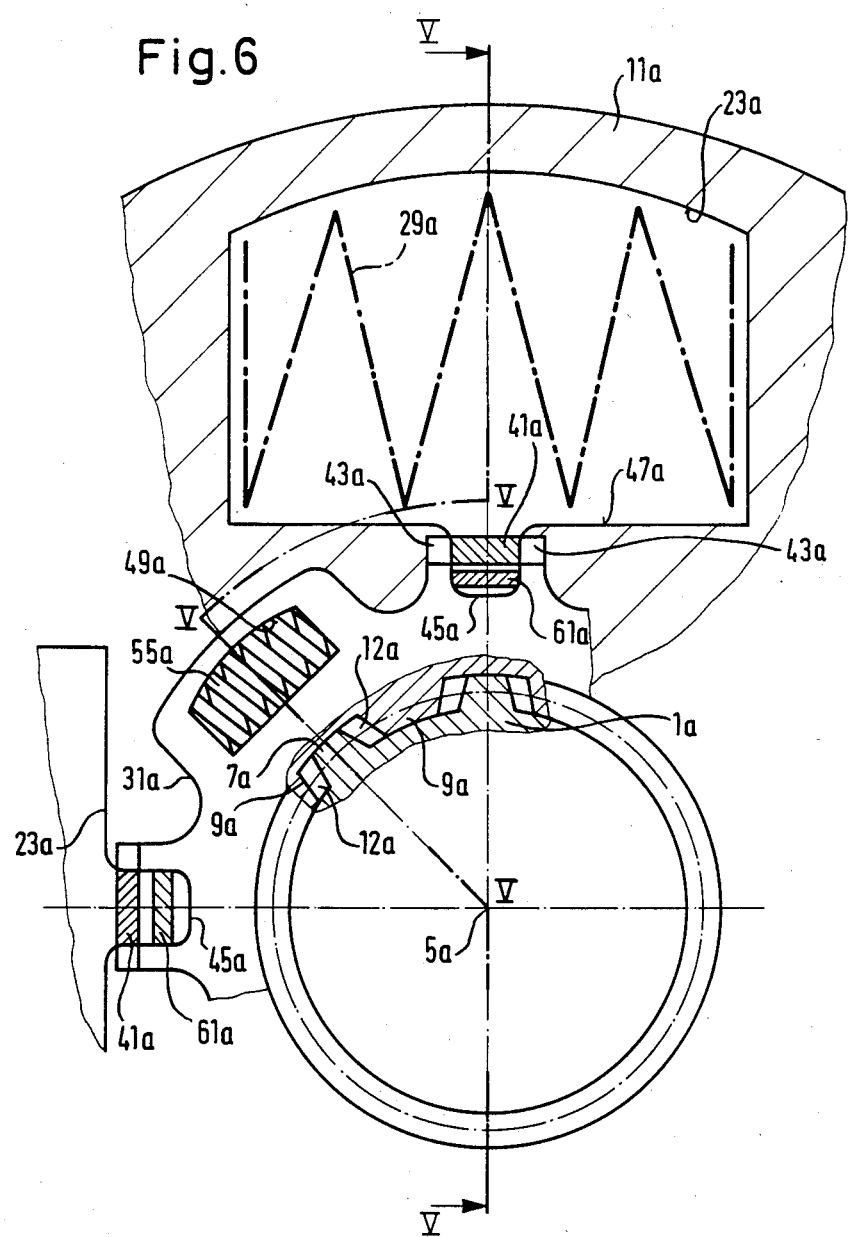
FIG. 6 shows an axial cross-section through the clutch disc seen along a line VI—VI in FIG. 5.

The clutch disc as represented in FIGS. 5 to 7 differs from the clutch disc of FIGS. 1 to 4 essentially only in the axial fixing of the torsional vibration dampers to the hub. In FIGS. 5 to 7 therefore parts of like effect are designated with the reference numerals of FIGS. 1 to 4, and provided with the letter a for distinction. For the explanation of the assembly and of the manner of operation, reference is made to the description of FIGS. 1 to 4. Individually, the parts 1 to 71 in FIGS. 1 to 4 correspond to the parts 1a to 71a in FIGS. 5 to 7. The distance rivets 17, the lining carrier disc 19 and the clutch friction linings 21 are however omitted from FIGS. 5 to 7, for the sake of simplicity.

In contrast to the clutch disc according to FIGS. 1 to 4, the torsional vibration dampers are fixed axially without the use of securing rings and upset portions such as are represented at 73 and 75 in FIGS. 1 to 4. In the one axial direction the torsional vibration damper arrangement is fixed by the shoulder 35a of the external toothing 7a of the hub 1a. For fixing in the other axial direction a shoulder 79 axially opposite to the shoulder 35a is provided on the side of the hub disc 11a axially remote from the hub disc 31a, and the side disc 13a rests against the shoulder 79. The shoulder 79 is formed by the end face of the external toothing 7a of the hub 1a. The hub disc 11a is not separately axially fixed.

For the sake of completeness it should be mentioned that in FIG. 5 in addition to the sectional representation corresponding to the line V—V in FIG. 6, a sectional representation analogous to the section along the line II—II according to FIG. 2 is entered in chain lines, in order to clarify the tabs 61a and 39a respectively formed on the pressure plate 59a and the side disc 37a.

In the examples of embodiment as explained above, the tabs 61 and 61a are arranged on the external circumference of the pressure plates 59 and 59a respectively. The tabs can also be provided on the internal circumference to relieve the hub disc 11.

Figure 8:
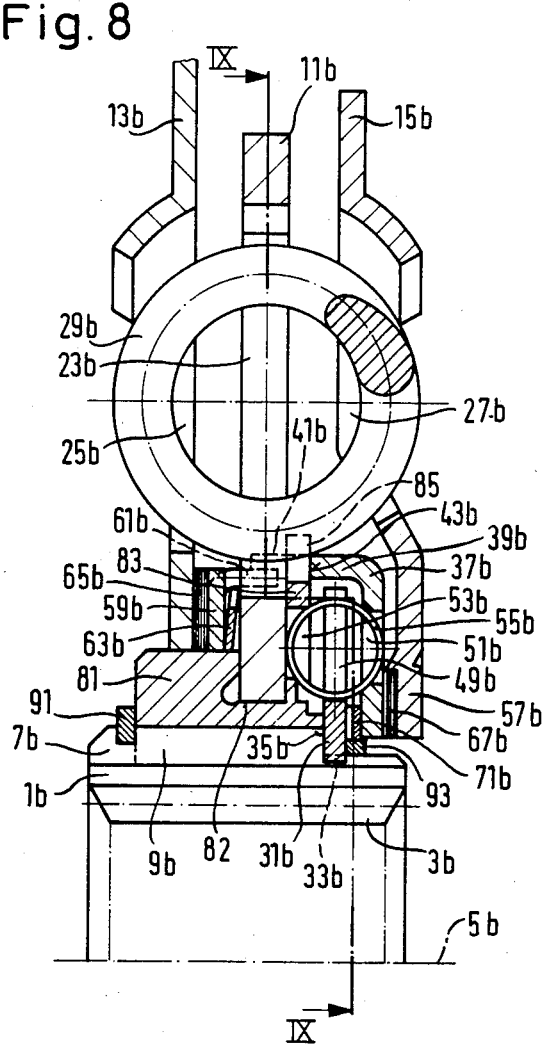
FIG. 8 shows an axial longitudinal section through one half of a third embodiment of a clutch disc for a motor vehicle friction disc clutch.
Figure 9:
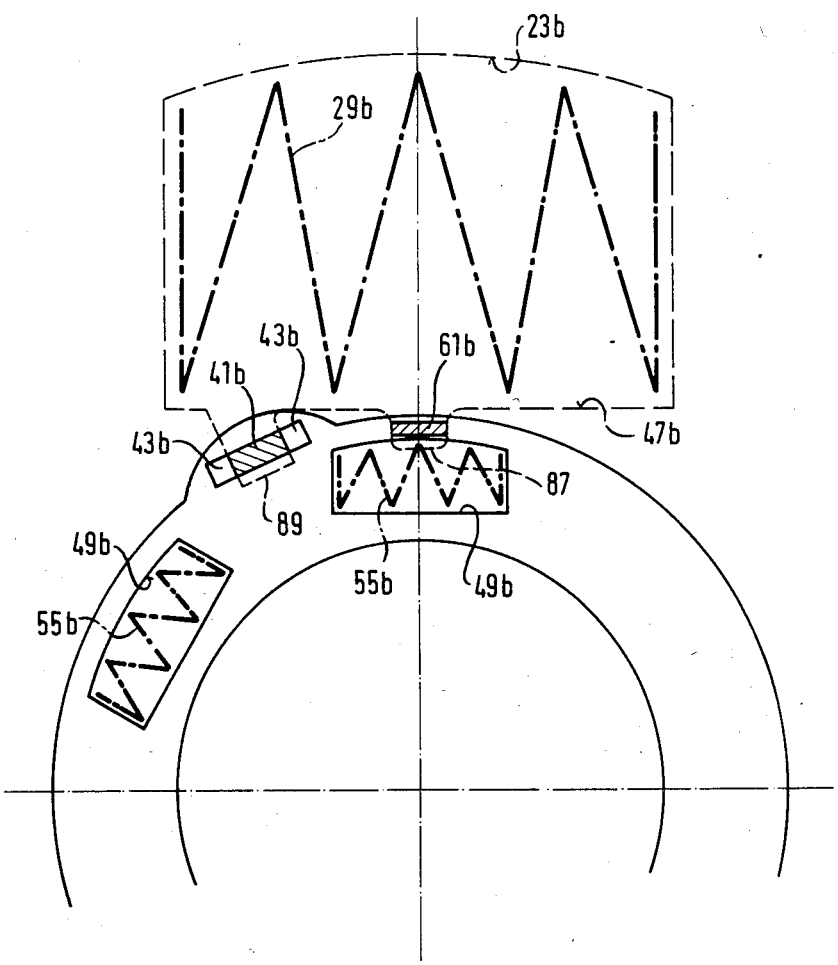
FIG. 9 shows a diagrammatic section through the clutch disc seen along a line IX—IX in FIG. 8.

FIGS. 8 and 9 show a clutch disc in which the toothing between the hub and the hub disc is axially prolonged for the transmission of greater torques. Otherwise, the clutch disc corresponds to the clutch disc according to FIGS. 1 to 4, except for the differences explained below, so that for more detailed explanation reference is made to the description of these Figures. Parts of like effect are here designated with the reference numerals of FIGS. 1 to 4, but with the letter b for distinction. Individually, the parts 1 to 7, 13, 15, 23 to 43, 47 to 51, 55 to 67 and 71 correspond to the parts 1b to 7b, 13b, 15b, 23b to 43b, 47b to 51b, 55b to 67b and 71b. The parts 12 and 17 to 21 are not represented, but are likewise present.

The axial widening of the toothing between the hub 1b and the hub disc 11b is achieved by a hub body 81 of sleeve form enclosing the hub 1b. The hub body 81 has a seating 82 on which the hub disc 11b is seated non-rotatably and also axially fixedly. The internal toothing 9b corresponding to the internal toothing 9 is provided on the internal shell of the hub body 81 and couples the hub disc 11b with the hub 1b, with a predetermined play in rotation.

In order to attenuate the material cross-section of the hub disc 11b only as little as possible, the windows 53b idling vibration damper, which correspond to the windows 53, are provided not in the hub disc 11b but in an additional side disc 83. The side disc 83 is seated axially between the hub disc 11b and the hub disc 31b and has openings 85 on its external circumference through which the noses 41b of the side disc 39b engage couple the side discs 83 and 39b non-rotatably with one another. The shoulders 43b of the tabs 39b lie against the side disc 83 and are supported through this side disc on the hub flange 11b.

In contrast to the clutch disc according to FIGS. 1 to 4, the tabs 39b and 61b of the side disc 37b and the pressure plate 59b do not engage in common openings of the hub disc 11b. The tabs 61b engage separately in openings 87 widening radially inwards from the inner edges 47b of the windows 23b, which openings are provided in the middle of the windows 23b. Openings 89 offset in the circumferential direction in relation to the openings 87 are provided to receive the noses 41b of the tabs 39b. The openings 89 are provided in the circumferential direction between neighboring windows 49b and open likewise to the radially inner edge of the windows 23b of the hub disc 11b. Due to this measure the space radially within the windows 23b can be utilized better, so that windows 49b and thus torsion springs 55b of the idling vibration damper can be provided also radially within the windows 23b.

A securing ring 91 similar to the securing ring 73 is provided, abutting on one end face of the hub body 81, for the axial fixing of the torsional vibration dampers, on the end of the external toothing 7b of the hub 1b axially opposite to the idling vibration damper. A further securing element 93 is provided similarly to the securing element 75 on the side of the hub disc 31b axially remote from the hub body 81. Furthermore, the hub disc 13b is not mounted directly on the hub 1b, but on a circumferential surface of the hub body 81. In FIGS. 8 and 9 a friction ring corresponding to the friction ring 69 is not represented. However, such a friction ring can be present between the hub disc 31b for the one part and the hub body 81 and/or the side disc 83 for the other part.

While specific embodiments of the invention have been shown and described in detail to illustrate the application of the inventive principles, it will be understood that the invention may be embodied otherwise without departing from such principles.

We claim:

1. A clutch disc for a motor vehicle friction disc clutch, comprising
   (a) a hub provided with an external toothing and defining an axis of rotation;
   (b) two hub discs coaxially surrounding the hub in annular form, of which a first hub disc carries on its internal circumference an internal toothing which engages in the external toothing and couples the first hub disc non-rotatably but with predetermined play in rotation with the hub and of which a second hub disc is held non-rotatably on the hub substantially without play in rotation;
   (c) two first side discs arranged on axially opposite sides of the first hub disc, which are connected to form a unit mounted on the hub rotatably in relation to the hub and the first hub disc;
   (d) several first damping springs arranged on a common diameter circle in windows of the first hub disc and the first side discs and stressable in the relative rotation, in operation under load, between the first hub disc and the first side discs;
   (e) at least on one side of the second hub disc a second side disc rotatable in relation to the second hub disc;
   (f) at least one second damping spring arranged radially between the external toothing of the hub and the diameter circle on which the first damping springs are arranged, in windows of the second hub disc and every second side disc, stressable in the relative rotation between the second hub disc and every second side disc, and dimensioned for idling operation; and
   (g) clutch friction linings connected with the unit of the first side discs;
   (h) the second hub disc, every second side disc and every second damping spring being arranged axially between the first hub disc and one of the two first side discs;
   (i) every second side disc being connected non-rotatably with the first hub disc.

2. A clutch disc according to claim 1, wherein one of the second side discs is arranged axially between the second hub disc and the mentioned one of the two first side discs and is supported non-rotatably by means of distance members on the first hub disc, wherein an axially acting spring is arranged axially between the first hub disc and the other of the two first side discs and wherein a friction ring for friction damping in operation under load is arranged axially between the one of the two first side discs and the mentioned one second side disc.

3. A clutch disc according to claim 2, wherein an annular pressure plate coupled non-rotatably but axially movably with the first hub disc is arranged axially between the said other one of the two first side discs and the axially acting spring and a further friction ring for the friction damping in operation under load is arranged axially between this other first side disc and the pressure plate.

4. A clutch disc according to claim 2, wherein a further, axially acting, annular spring is arranged, on the side of the second hub disc axially remote from the first hub disc, axially between the second hub disc and the second side disc, said further spring generating a smaller initial axial stress force than does the first-mentioned axially acting spring.

5. A clutch disc according to claim 4, wherein the further axially acting spring is formed as a corrugated spring.

6. A clutch disc according to claim 4, wherein a friction ring for friction damping in idling operation is arranged axially between the first hub disc and the second hub disc.

7. A clutch disc according to claim 2, wherein the distance members are formed as tabs formed integrally on the second side disc and protruding axially of the first hub disc, which engage with their free ends in openings of the first hub disc and have shoulders facing the first hub disc in the region of their free ends.

8. A clutch disc according to claim 7, wherein an annular pressure plate coupled non-rotatably but axially movably with the first hub disc is arranged axially between the said other one of the two first side discs and the axially acting spring and a further friction ring for the friction damping in operation under load is arranged axially between this other first side disc and the pressure plate, wherein on the pressure plate there is integrally formed at least one tab protruding axially of the first hub disc, which tab engages in one of the openings provided to receive the tabs of the second side disc, in the first hub disc.

9. A clutch disc according to claim 8, wherein the openings are provided in the region of the radially inner edging of the windows of the first hub disc which receive the first damping springs and wherein several second damping springs offset in relation to one another in the circumferential direction are arranged on a diameter circle extending approximately through the openings, between the openings in the circumferential direction, the tabs of the side disc and of the pressure plate engaging in common openings of the first hub disc.

10. A clutch disc according to claim 8, wherein several second damping springs offset in relation to one another in the circumferential direction are provided on a common diameter circle, said openings being provided radially outside the diameter circle in the region of the radially inner edging of the windows of the first hub disc which accommodate the first damping springs, said opening serving to receive the tabs of the pressure plate are offset in the circumferential direction in relation to the openings for the tabs of the second side disc.

11. A clutch disc according to claim 7, wherein the openings are formed as radial widenings of the windows of the first hub disc which receive the first damping springs.

12. A clutch disc according to claim 7, wherein axially between the first hub disc and the second there is arranged a further second side disc provided with windows to receive the second damping springs and wherein the further second side disc has openings for the passage of the tabs of the first-mentioned second side disc and is held by means of these tabs non-rotatably on the first hub disc.

13. A clutch disc according to claim 1, wherein one single second side disc is provided axially between the second hub disc and the mentioned one of the two first side discs and wherein the first hub disc comprises, for each of the second damping springs, a window, corresponding with the windows of the second hub disc and of the second side disc, for the reception of the second damping spring.

14. A clutch disc according to claim 1, wherein the external toothing of the hub has at its one axial end a first shoulder facing axially towards the adjacent first side disc, against which shoulder this first side disc rests, said external diameter of the external toothing being reduced in the region of its other axial end, forming a second shoulder opposite to the first shoulder, said second hub disc comprising an internal toothing which engages in the part of smaller diameter of the external toothing and couples the second hub disc non-rotatably with the hub, the second hub disc resting on the second shoulder.

15. A clutch disc according to claim 1, wherein the first side disc arranged on the side of the second hub disc is domed axially away from the first hub disc, radially within the region defined by the windows of the first damping springs, in accordance with the axial space requirement of the first damping springs.

* * * * *